Patented July 30, 1929.

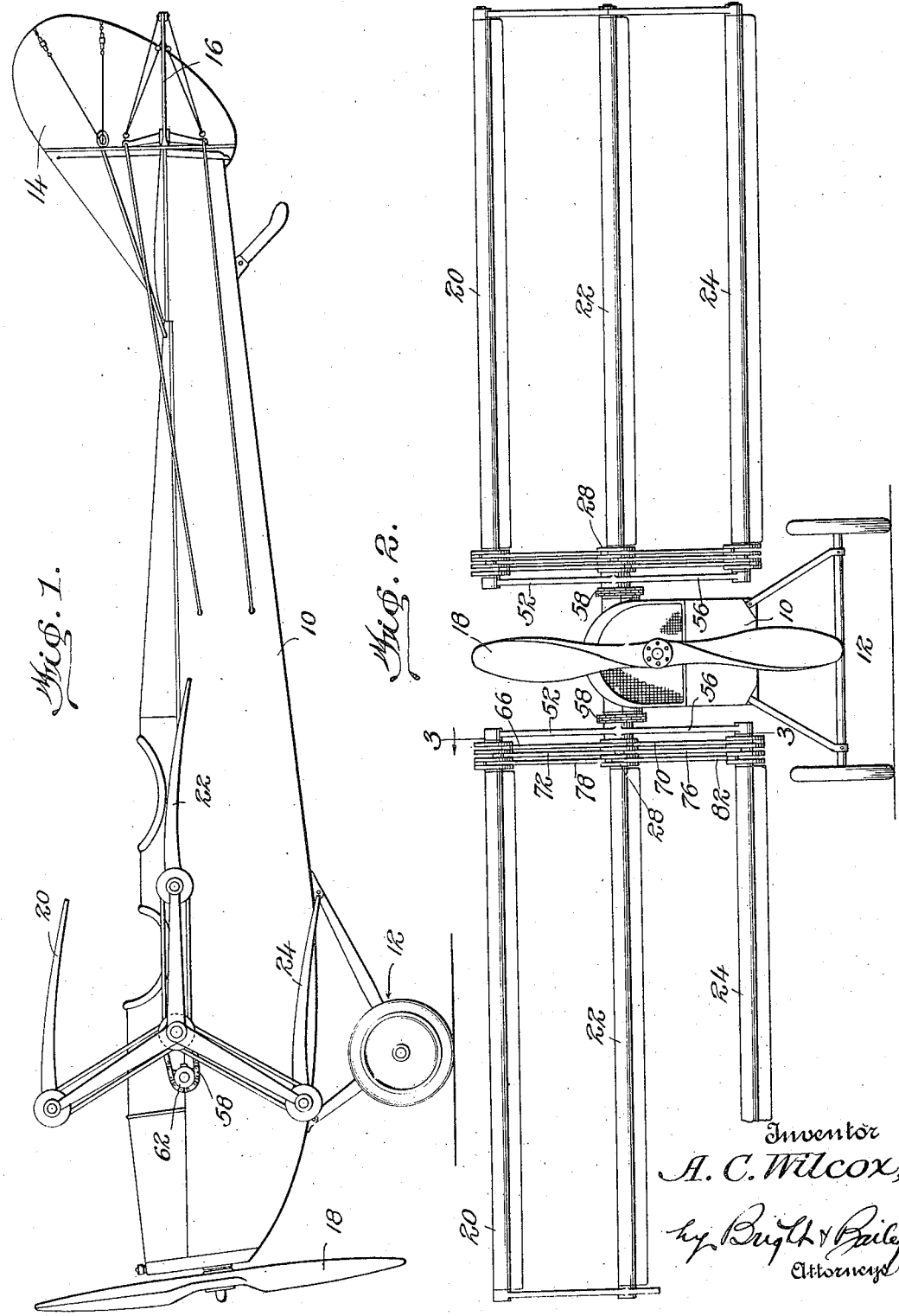

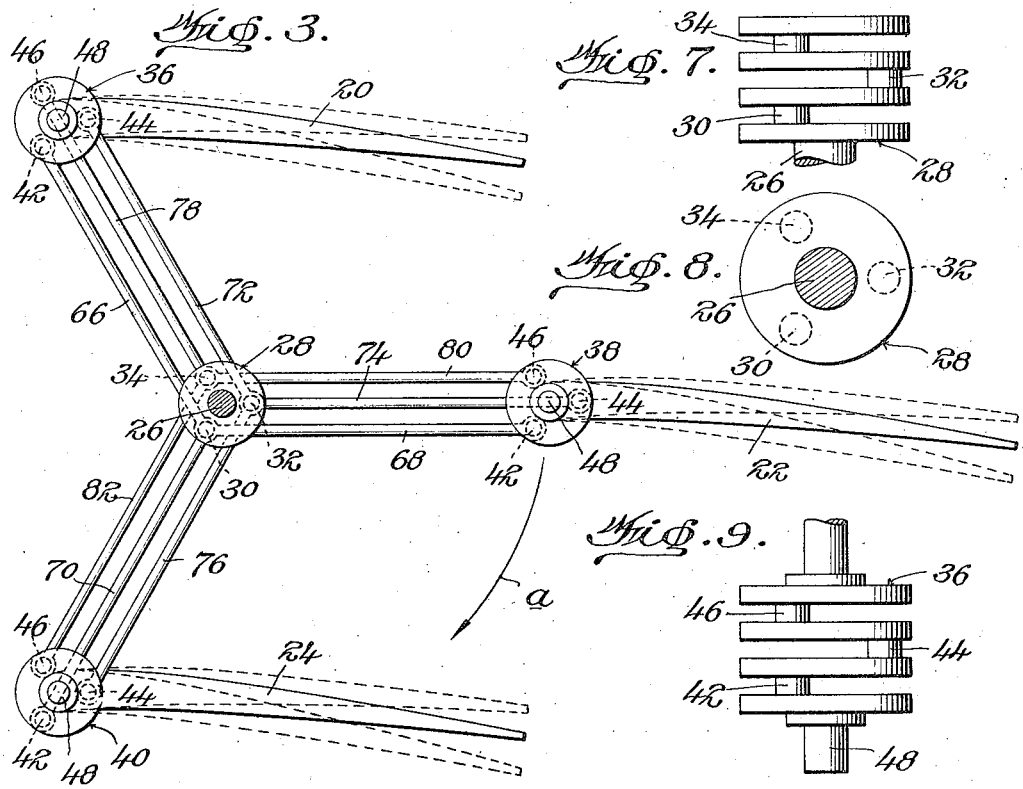
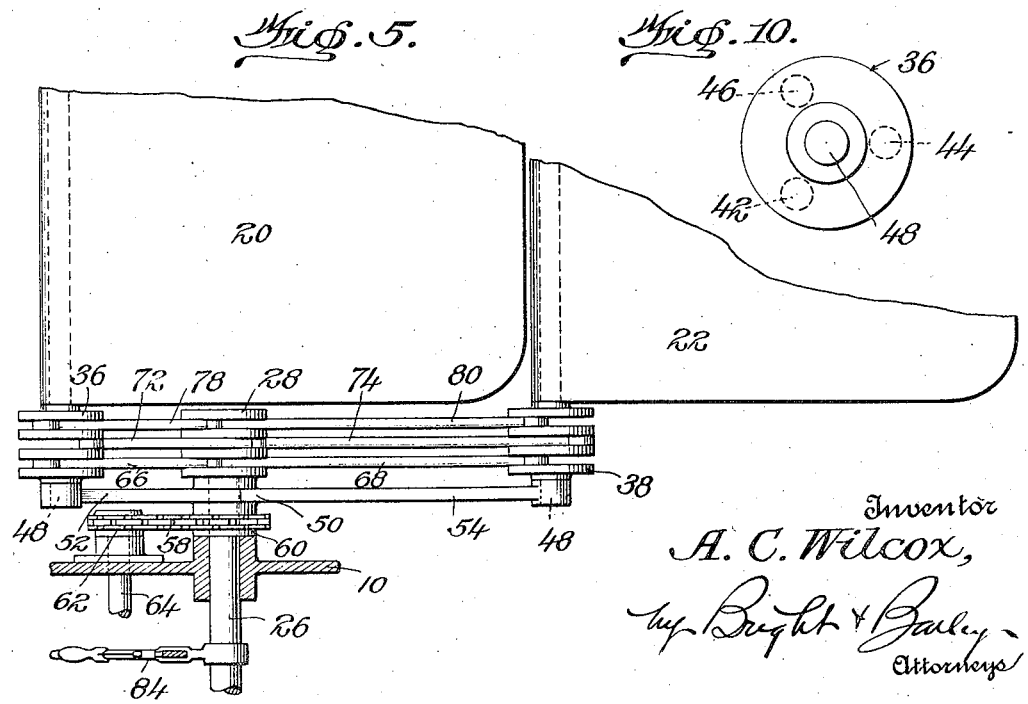

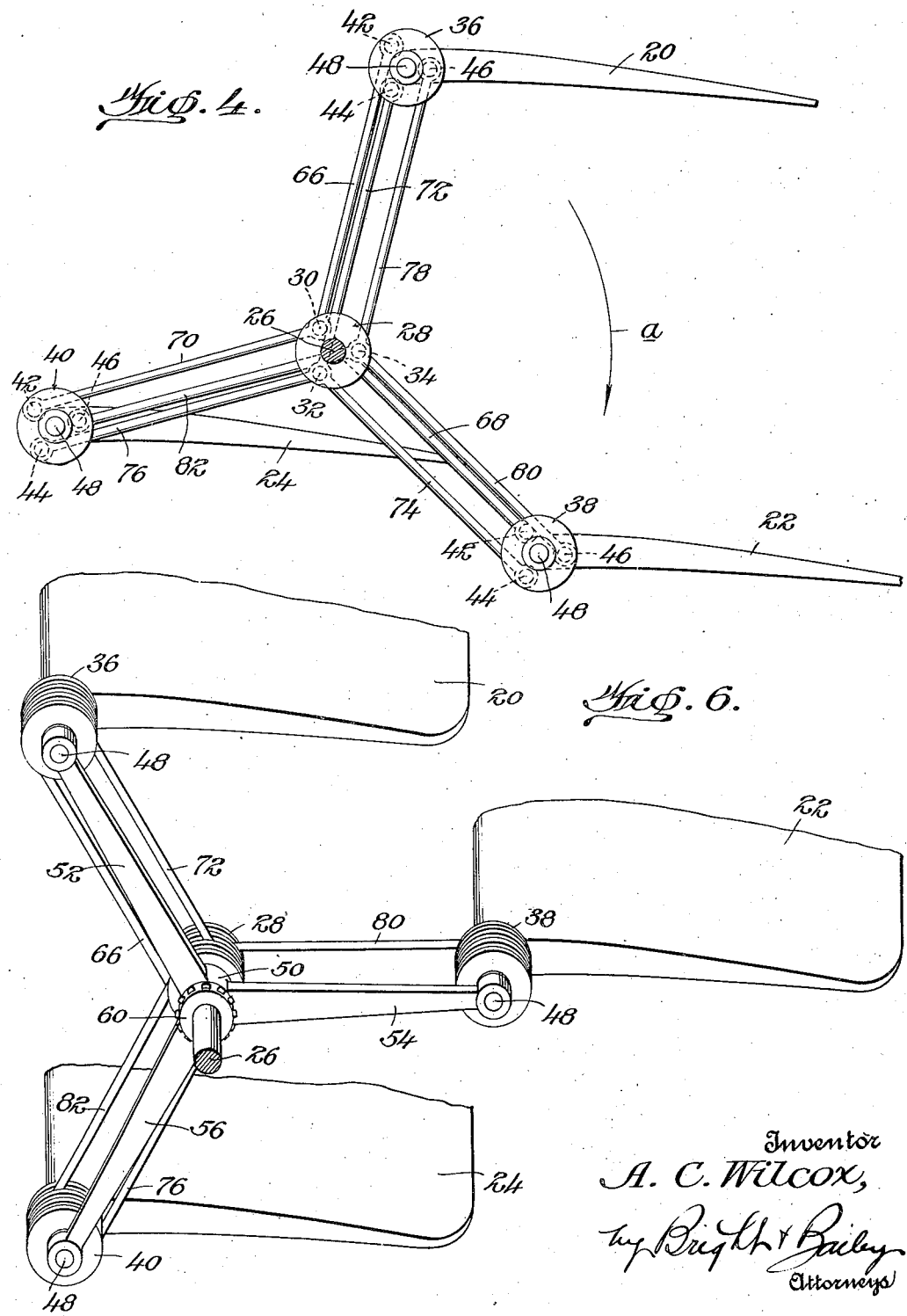

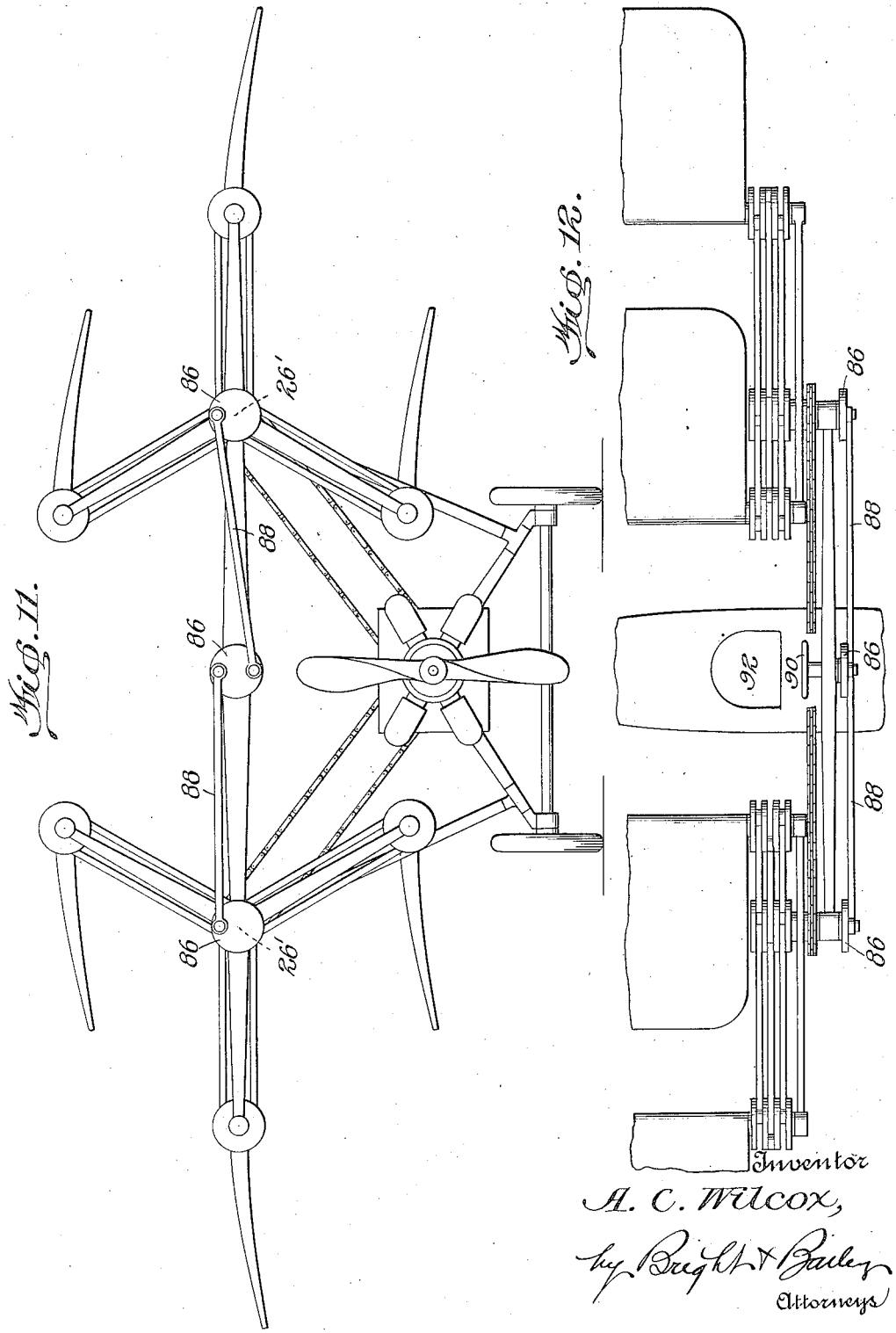

1,722,651

UNITED STATES PATENT OFFICE.

ALBERT C. WILCOX, OF BRIDGEPORT, OHIO.

AIRCRAFT.

Application filed March 31, 1927. Serial No. 179,924.

My invention relates to improvements in aircraft of any type, whether heavier or lighter than air, employing wings as supporting or stabilizing surfaces, my important purposes being twofold; viz, to provide means for so moving the wings of an aircraft as to cause them to lift the craft into the air in substantially a direct vertical direction, thereby to eliminate entirely, or at least in part, the necessity of taxying to secure a take off; and to provide means under the control of the pilot to vary at any time the angle of incidence of the wings, whereby the craft may be caused to ascend rapidly, to have maximum speed in flight, and to descend and land within a minimum area.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Fig. 1 is a side elevation of an aircraft embodying my improvements;

Fig. 2, a front elevation of the aircraft shown in Fig. 1;

Fig. 3, an enlarged section on the line 3—3 of Fig. 1, showing in dotted lines different adjustments of the angle of incidence of the wings;

Fig. 4, a view similar to Fig. 3 showing the manner in which the wings are moved to lift the aircraft without taxying;

Fig. 5, a top plan view of the structure shown in Fig. 3;

Fig. 6, a perspective view of the structure shown in Fig. 3;

Fig. 7, a plan view of the crank device movable to vary the angle of incidence of the wings;

Fig. 8, an end view of the crank device shown in Fig. 7;

Fig. 9, a plan view of one of the wing carried crank devices which cooperate with the crank device shown in Fig. 7;

Fig. 10, an end view of the crank device shown in Fig. 9;

Fig. 11, a front elevation of an aircraft showing a modified embodiment of my invention; and Fig. 12, a top plan view of a portion of the structure shown in Fig. 11.

Referring now to the drawings in detail, it will be observed that I have illustrated my improvements as embodied in an airplane of well known type, including, as usual, a body 10, a landing gear 12, vertical and horizontal stabilizers 14, 16, respectively, at the rear end of the body, a propeller 18 at the forward end of the body, driven by a motor, not shown, mounted in any suitable manner within or upon the body, and, in this particular instance, three wings 20, 22 and 24 at each side of the body for supporting the craft in flight.

A horizontally disposed shaft 26 extends transversely across the body and the wings at one side of the body are mounted upon one end of this shaft while the wings at the other side of the body are mounted upon the other end thereof. Duplicate mechanisms are employed for mounting the wings at the two sides of the body upon the ends of said shaft and therefore a detailed description of one of said mechanisms will suffice for both. It is as follows: Formed as part of or rigidly secured to shaft 26 is a crank device 28, illustrated in detail in Figures 7 and 8, including three crank pins 30, 32 and 34 arranged in a circle concentric with respect to the axis of said shaft and spaced with respect to one another equal angular distances, 120° apart and also spaced with respect to one another in the direction of the axis of said shaft.

Three additional crank devices 36, 38 and 40 are provided and these are rigidly secured, respectively, to the wings 20, 22 and 24 at their inner ends and, preferably, adjacent to their leading edges. Each crank device 36, 38 and 40 includes three crank pins 42, 44 and 46 arranged in the same relative relation as the crank pins 30, 32 and 34 of crank device 28. In addition each crank device 36, 38 and 40 has projecting inwardly therefrom a stub shaft 48.

A three-arm spider member 50, the arms 52, 54 and 56 of which are of equal length and spaced angularly equal distances, 120°, apart, is mounted on shaft 26 for rotation with respect thereto, the outer or free ends of said arms being connected through the instrumentality of the stub shafts 48 with the crank devices 36, 38 and 40, respectively, so that upon rotation of said spider member the normally horizontally disposed wings 20, 22 and 24 will be rotated in a vertical plane in a circle about a center constituted by shaft 26.

Rotation of spider member 50 may be effected in any suitable or desired manner, as, for example, by means of a chain 58 trained over a pair of sprocket wheels 60, 62 one of which is fixed to said spider member and the other of which is fixed to a shaft 64 driven in any suitable manner from the power plant of the craft, the connection, not shown, between shaft 64 and the power plant preferably including a clutch of any suitable design whereby rotation of the wings may be effected at will by the pilot during continuous operation of the power plant.

Radiating from crank pin 30 of crank device 28 are three rods 66, 68 and 70 of equal length and spaced with respect to one another equal angular distances, 120° apart, the outer ends of these arms being connected, respectively, with the crank pins 42 of the crank devices 36, 38 and 40. Similarly, radiating from crank pin 32 of crank device 28 are three rods 72, 74 and 76 of equal length, spaced with respect to one another equal angular distances, 120° apart and connected, respectively, at their outer ends with the crank pins 44 of the crank devices 36, 38 and 40, while likewise radiating from crank pin 34 of crank device 28 are three rods 78, 80 and 82 of equal length, spaced with respect to one another equal angular distances, 120° apart, and connected, respectively, at their outer ends with the crank pins 46 of crank devices 36, 38 and 40.

Any suitable means such as a lever 84 is provided for rotatably adjusting shaft 26 and for holding it in any rotatably adjusted position in which it may be placed, and thus it is apparent, due to the spider member 50 being rotatable on shaft 26 and to the crank devices 36, 38 and 40 being fixed with respect to the wings and connected in the manner mentioned with crank device 28 which is rigid with shaft 26, that upon rotation of the spider member 50 to rotate the wings 20, 22 and 24 in a circle about shaft 26, the rods connecting the crank device 28 with crank devices 36, 38 and 40 will react from said crank device 28 to maintain a given angle of incidence of all of the wings despite their rotation. It also is apparent that simply by rotatably adjusting shaft 26 through the instrumentality of lever 84 the crank and rod connections between said shaft and the wings 20, 22 and 24 will result in rotatable adjustment of the devices 36, 38 and 40 with consequent adjustment of the angle of incidence of all of said wings simultaneously, which adjustment obviously may be effected either while the wings are being rotated by the spider 50 or while they are at rest.

By reason of the arrangement just described whereby the angle of incidence of the wings is maintained while the wings are being rotated, and by reason of the free ends of the arms of spider 50 being connected to the wings at their leading edges, it follows that if spider 50 is rotated in the direction of the arrow *a* shown in Figures 3 and 4 of the drawings, the wings, as they are rotated, will approach the shaft 26 as they move upwardly and recede from said shaft as they move downwardly. Consequently the leverage between the individual wings and shaft 26 is greater during downward movement of the wings than during upward movement thereof, and due to this variable leverage, the wings, reacting from the air, will, during their rotation, exert a lifting force on the craft to raise the same into the air without the necessity of taxying to effect the usual take off employed to accomplish the same purpose.

After the craft has been lifted into the air it is contemplated that forward progress thereof will be produced and controlled by the propeller 18, although I consider it within the scope of my invention to eliminate the propeller 18 and to so shape the wings that these of themselves will, when rotated, impart forward progress to the craft. To depend on the wings to drive the craft forwardly, however, would require the wings to be maintained constantly in motion, which I do not consider desirable. I therefore prefer to use a propeller to impart forward motion to the craft and to rotate the wings only to raise the craft into the air or to assist in climbing, in which event I contemplate stopping rotation of the wings when the craft has reached a sufficient elevation to permit maneuvering thereof in the usual well known manner, in which connection it will be observed that due to the arrangement whereby the angle of incidence of the wings may be varied, maneuvering of the craft as well as take offs and landings effected in the usual manner may be greatly facilitated regardless of whether provision is or is not made for rotating the wings.

In the present instance I have shown the wings extending transversely with respect to the body of the craft and rotatable in a vertical plane about a horizontal axis which also extends transversely with respect to the body of the craft. It is possible, however, especially if it is found feasible to maintain the wings constantly rotating, to arrange them longitudinally with respect to the body and to have them rotate in a vertical plane about an axis which also extends longitudinally with respect to the body, this alternate arrangement being conventionally illustrated in Figures 11 and 12 of the drawings, in which figures it will be observed that the structure for rotating and adjusting the angle of incidence of the wings is, to all interests and purposes, the same as the structure illustrated in the preceding figures of the drawings, the only material difference being that in the modified arrangement two shafts 26′ corresponding to shaft 26 of Figures 1 to 10 are employed, one individual to each set of wings, and that these shafts 26', instead of being provided with individual levers such as shown at 84 in Fig. 5, for rotatably adjusting them to vary the angle of incidence of the wings, are connected by cranks and rods 86, 88 to a common operating handle or lever 90 of any preferred type located in proximity to the pilot's seat 92 whereby adjustment of all of the wings may be effected simultaneously.

It will be understood, of course, that the present drawings are more or less conventional throughout and do not propose to illustrate the refinement of detail necessary in carrying my invention into practice, since various different structural arrangements may be provided for rotating the wings and for varying their angle of incidence, these features, broadly, being what I consider my invention regardless of specific mechanisms which might be employed for carrying them into practice. It will be understood, also, that while I have illustrated my improvements as embodied in a triplane, this is done merely for convenience and because a triplane is considered best adapted to have my improvements incorporated therein, it being obvious, in view of the foregoing description that the number of wings may either be decreased or increased to suit special requirements and that the type of craft upon which the wings are mounted is relatively unimportant. In addition I would point out that I am fully aware that it is old in the aircraft art, especially in heliocopters, to provide wings that are rotatable in a horizontal plane about a vertical axis as a means of lifting a craft into the air; also that it is old to adjust ailerons and similar control devices for purposes of controlling the flight of a craft having fixed wings. I believe, however, that I am the first to provide means for rotating the normally horizontally disposed main supporting wings of an aircraft about a horizontal axis in such manner as to cause them to lift the craft into the air, and that I am the first to provide means whereby the angle of incidence of the main supporting wings of an aircraft as distinguished from ailerons and similar devices may be varied by the pilot while the craft is in flight. It should be understood therefore that when I use the term "supporting wing" in the annexed claims I intend to include the main supporting wings and not to include such auxiliary devices as ailerons, etc., which might in a broad sense be termed supporting wings.

I claim:

1. An aircraft including a propeller for imparting forward progress thereto, a plurality of supporting wings mounted at their forward ends for rotation about a normally horizontal axis, and means to maintain a given angle of incidence of each wing at all times during their rotation whereby, when rotated, their rear ends will be caused to approach and recede with respect to their axis of rotation, thus to produce variable leverage actions during their rotation tending to lift the craft in a substantially vertical direction and whereby, when the craft has reached a desired elevation, and upon stoppage of rotation of said wings in any rotated position thereof, they will have a correct angle of incidence to act as craft sustaining wings as forward progress is imparted to the craft by said propeller.

2. An air craft including a body, a rotatably adjustable shaft extending horizontally from said body, an arm mounted for rotation about said shaft, a supporting wing connected along one edge thereof to the outer end of said arm, means for rotating said arm to rotate said wing about said shaft, and a connection between said shaft and said wing effective when said shaft is held against rotation to maintain a given angle of incidence of said wing at all times during its rotation about said shaft and also effective when said shaft is rotated to change the angle of incidence of said wing, and means for rotatably adjusting said shaft.

3. An aircraft including a body, a shaft extending horizontally from said body, an arm mounted for rotation about said shaft, a supporting wing mounted on said arm for rotation relative thereto, means for rotating said arm to rotate said wing about said shaft, at least three crank devices fixed with respect to said wing and evenly spaced radially and circumferentially with respect to the axis of rotation of said wing relative to said arm, at least three other crank devices fixed to said shaft and evenly spaced radially and circumferentially with respect to the axis thereof, and rods connecting related pairs of said crank devices.

4. An aircraft including a body, a shaft extending horizontally from said body, an arm mounted for rotation about said shaft, a supporting wing mounted on said arm for rotation relative thereto, means for rotating said arm to rotate said wing about said shaft, at least three crank devices fixed with respect to said wing and evenly spaced radially and circumferentially with respect to the axis of rotation of said wing relative to said arm, at least three other crank devices fixed to said shaft and evenly spaced radially and circumferentially with respect to the axis thereof, rods connecting related pairs of said crank devices, and means for rotatably adjusting said shaft.

5. An aircraft including a body, a normally horizontal shaft mounted on said body, at least three crank devices fixed to said shaft and evenly spaced radially and circumferentially with respect to the axis thereof, a spider member journaled on said shaft for rotation with respect thereto, said spider member including a plurality of radial arms disposed equal angular distances apart, a wing mounted on each arm for rotation with respect thereto, at least three crank devices fixed to each wing and evenly spaced radially and circumferentially with respect to the axis of rotation of each wing relative to its related spider arm, and a plurality of rods connecting each crank device of said shaft with one of the crank devices of each wing.

In testimony whereof I hereunto affix my signature.

ALBERT C. WILCOX.